(No Model.)
F. M. BACON.
CORN STALK FODDER.
No. 258,273.          Patented May 23, 1882.
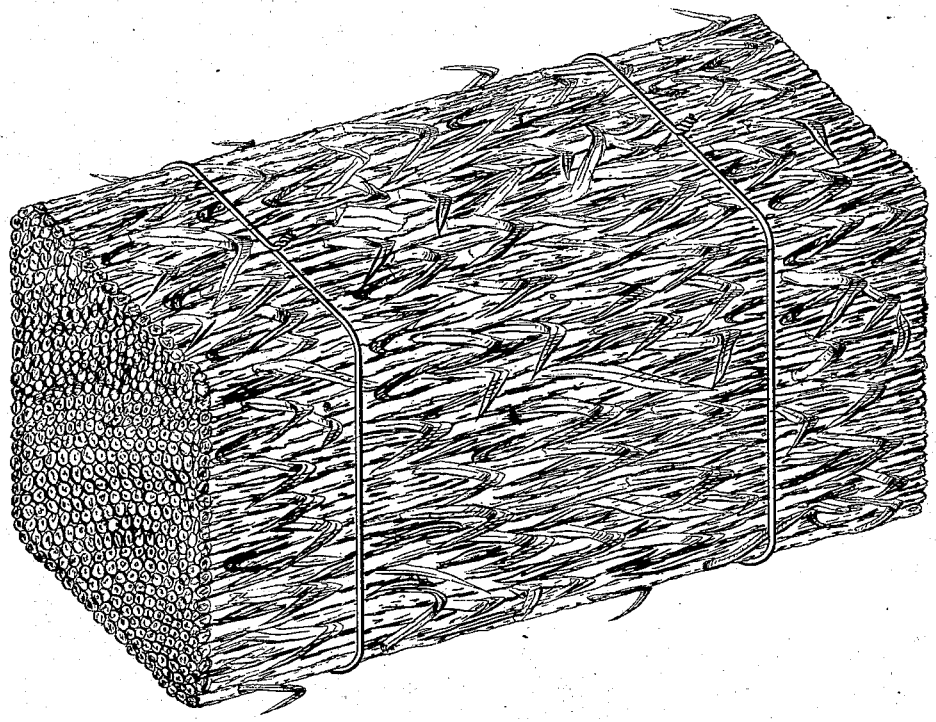
Witnesses
Chas. H. Smith
Harold Serrell
Inventor
Frank M. Bacon
per Lemuel W. Serrell
atty

United States Patent Office.

FRANK M. BACON, OF PLAINFIELD, NEW JERSEY, ASSIGNOR TO HIMSELF, JOSEPH FOWLER, AND CARMAN PARSE, OF SAME PLACE.

CORNSTALK-FODDER.

SPECIFICATION forming part of Letters Patent No. 258,273, dated May 23, 1882.

Application filed September 12, 1881. (No model.)

*To all whom it may concern:*

Be it known that I, FRANK M. BACON, of Plainfield, in the county of Union and State of New Jersey, have invented an Improvement in Baling Crushed and Cut Cornstalk-Fodder, of which the following is a specification.

It is well known that cornstalks form excellent fodder for cattle; but in consequence of the difficulty of transportation much of this valuable material is either burned up or else allowed to rot.

My invention is for rendering marketable cornstalk-fodder, whereby it is in a form that can be easily handled and transported, and can be used for feeding cattle without any further preparation, and it is adapted to be kept without deterioration.

I am aware that hay has been passed through rollers to flatten the same, and also that cornstalks have been shredded or cut up to improve it as fodder. These points, therefore, do not form the subject of my invention.

My invention relates to the bale of cornstalks as a new article of manufacture, the stalks being in a crushed condition and generally of lengths corresponding to the measurement of the bale in one direction, the stalks being laid parallel, or nearly so, to render the bale compact, and being compressed and secured by ropes or wires. This bale forms as good fodder as hay, and occupies no more space for the same weight, and can be furnished much cheaper than hay, thus utilizing a material that is often burned up to get rid of it.

A machine for crushing the cornstalks and cutting and baling the same having been devised by me, and forming the subject of a separate application, it is only necessary to say herein that any roots are cut off and the stalks and leaves passed through between crushing-rollers to flatten the stalks. The stalks and leaves are cut into lengths, and lie generally in one direction while being compressed, so as to consolidate the bale. I however do not limit myself to any particular machine for making the bale.

I remark that in feeding the stalks into the machine some should be passed in butt first and others top first, so that the material in the bale may be uniform, or nearly so, in its bulk.

If desired, two crushing-machines may be placed, one at each side of the baling mechanism, the stalks all being fed in butt first, and hence equalizing themselves in the bale.

The cornstalks are better for fodder in consequence of being crushed. The uneaten portions rot more quickly than the uncrushed stalks. The bales are compact and easily transported, and such bales become a new article of manufacture.

In the drawing I have shown the said bale by a perspective view.

I do not claim cutting up cornstalks or packing them under pressure in a storage-chamber. The material so packed is not in a condition for transportation.

I claim as my invention—

A bale of cornstalks in a crushed condition, cut to length, pressed, and tied for transportation, substantially as specified, as a new article for fodder.

Signed by me this 9th day of September, A. D. 1881.

FRANK M. BACON.

Witnesses:
EDWARD C. MULFORD,
J. OAKLEY NODYNE.